United States Patent
Bennett, III et al.

(10) Patent No.: US 7,167,543 B2
(45) Date of Patent: *Jan. 23, 2007

(54) SECURITY SYSTEM WITH CALL MANAGEMENT FUNCTIONALITY

(75) Inventors: Raymond Walden Bennett, III, Naperville, IL (US); John Roland Beardsley, Rolling Meadows, IL (US)

(73) Assignee: SBC Knowledge Ventures, L.P., Reno, NV (US)

( * ) Notice: Subject to any disclaimer, the term of this patent is extended or adjusted under 35 U.S.C. 154(b) by 851 days.

This patent is subject to a terminal disclaimer.

(21) Appl. No.: 10/017,989

(22) Filed: Dec. 6, 2001

(65) Prior Publication Data

US 2002/0054673 A1 May 9, 2002

Related U.S. Application Data

(63) Continuation of application No. 09/366,359, filed on Aug. 3, 1999, now Pat. No. 6,370,233.

(51) Int. Cl.
*H04M 4/04* (2006.01)

(52) U.S. Cl. .................... 379/37; 379/42; 379/90.01

(58) Field of Classification Search ................ 379/37, 379/38, 42, 43, 44, 93.35, 90.01, 102.01, 379/102.06, 211.03, 211.04, 201.1, 913, 211.02; 340/3.1, 825.24
See application file for complete search history.

(56) References Cited

U.S. PATENT DOCUMENTS

| | | | |
|---|---|---|---|
| 3,793,487 A * | 2/1974 | Kilby ........................... 379/74 |
| 4,107,466 A | 8/1978 | Churchill | |
| 4,578,540 A | 3/1986 | Borg et al. | |
| 4,612,419 A | 9/1986 | Smith | |
| 4,665,544 A | 5/1987 | Honda et al. | |
| 4,856,072 A * | 8/1989 | Schneider et al. ............ 381/86 |
| 5,086,385 A * | 2/1992 | Launey et al. ................ 700/83 |
| 5,166,972 A * | 11/1992 | Smith ........................... 379/49 |
| 5,274,698 A | 12/1993 | Jang | |
| 5,315,636 A | 5/1994 | Patel | |
| 5,363,425 A | 11/1994 | Mufti et al. | |
| 5,402,469 A | 3/1995 | Hopper et al. | |
| 5,440,620 A | 8/1995 | Slusky | |
| 5,479,496 A | 12/1995 | Endo et al. | |
| 5,596,633 A | 1/1997 | Meier et al. | |
| 5,621,662 A | 4/1997 | Humphries et al. | |
| 5,682,142 A | 10/1997 | Loosmore et al. | |
| 5,724,411 A | 3/1998 | Eisdorfer et al. | |
| 5,802,157 A | 9/1998 | Clarke et al. | |
| 5,901,211 A | 5/1999 | Dean et al. | |
| 5,995,597 A | 11/1999 | Woltz et al. | |

(Continued)

FOREIGN PATENT DOCUMENTS

JP 620 73 846 A 4/1987

(Continued)

*Primary Examiner*—Melur Ramakrishnaiah
(74) *Attorney, Agent, or Firm*—Toler Schaffer, LLP

(57) ABSTRACT

A security system with call management functionality is coupled to a telephone network for providing a telephone service and at least one telephone line. This system also includes a call management controller for enabling, disabling or changing telephone service based on user presence and identity. User presence and identity is determined by a security controller coupled to a plurality of sensors for providing at least one home security function.

7 Claims, 1 Drawing Sheet

U.S. PATENT DOCUMENTS

| | | |
|---|---|---|
| 6,002,427 A | 12/1999 | Kipust |
| 6,005,870 A | 12/1999 | Leung et al. |
| 6,161,128 A * | 12/2000 | Smyk ......................... 709/205 |
| 6,356,752 B1 * | 3/2002 | Griffith ....................... 455/406 |
| 6,549,612 B1 * | 4/2003 | Gifford et al. ............. 379/67.1 |

FOREIGN PATENT DOCUMENTS

| | | |
|---|---|---|
| JP | 043 34 158 A | 1/1992 |
| JP | 081 16 355 A | 5/1996 |
| JP | 100 98 521 A | 4/1998 |

* cited by examiner

US 7,167,543 B2

SECURITY SYSTEM WITH CALL MANAGEMENT FUNCTIONALITY

CROSS-REFERENCE TO RELATED APPLICATIONS

This is a continuation of U.S. patent application Ser. No. 09/366,359 filed on Aug. 3, 1999 now U.S. Pat. No. 6,370, 233.

TECHNICAL FIELD

The present invention relates generally to security systems and more particularly to a security system with call management functionality.

BACKGROUND ART

Because of increased security concerns many homeowners have a home security system. Many of these home security systems can be configured so that each resident is assigned a unique passcode. In operation, these individual passcodes can be used to change security system status or make ad hoc changes to system parameters. For example, security system status is commonly changed from "standby" to "arm" when the occupants are away. Similarly, system parameters are commonly changed to, for example, permit the security system to be in "night mode" even though there are open windows.

Security systems receive passcodes a number of different ways. Typically, a security system receives passcodes and system commands through a keypad. Recently, however, it has been suggested that security systems receive passcodes and system commands a variety of ways. For example, a user could be identified automatically by carrying a transponder, or by using a magnetically coded house key, or by using voice recognition.

Besides home security systems, many homeowners subscribe to a variety of call management services. These service range from call waiting and caller ID, to voice mail and restricted 900 number access. These services are not typically related to any individual's presence in the home. A number of additional services could be provided to a homeowner if these call management services were integrated with a home security system.

Thus, there exists a need for a security system that can integrate the security system with the call management services already found in many homes.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
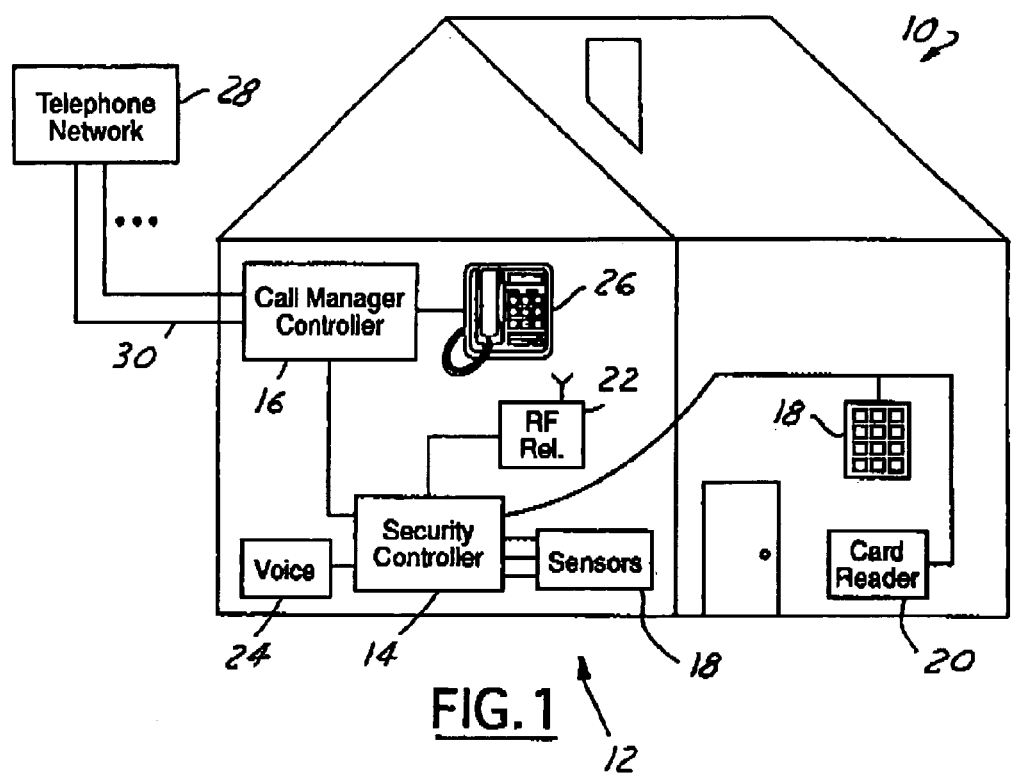
FIG. 1 is a block diagram of a house having a security system with call management functionality according to the present invention.

Referring to FIG. 1, a block diagram of a house 10 having a security system 12 with call management functionality according to the present invention is illustrated. Security system 12 is located in house 10 and includes two major components comprising a security controller 14 and a call management controller 16.

Security controller 14 is located in house 10 and is coupled to a plurality of sensors 18 to provide security system functions. The security controller 14 and sensors 18 are conventional. For example, sensors 18 are located in various positions in house 10 and include window and door position sensors and motion detectors to detect unauthorized entry into house 10. Security controller 14 is also coupled to several devices that are used for user identification and system commands. Additionally, security controller 14 is conventionally also tied to a phone line to contact 911 or a monitoring center. Each user of security system 12 has a unique ID or passcode.

Call management controller 16 is located in house 10 and is coupled to at least one handset 26 and a telephone network 28, which provides at least one phone line 30. Call management controller 16 is also coupled to security controller 14. By using information from security controller 14, call management controller 16 can provides a variety of new call management services as is more fully described below.

In the present invention, user identification is accomplished through a keypad 18, a card reader 20, a radio frequency receiver 22, a voice processing system 24 or the like. Keypad 18 can be located anywhere in house 10 and identifies users and changes system settings through input of unique passcodes and command codes. Card reader 20 is usually located near an entrance to house 10 and identifies users through a magnetically coded door key that is unique to each user. Radio frequency receiver 22 is located so that it can receive a signal from a unique transponder (not pictured) carried by any user of security system 12. Users are identified through communication between the individual transponder and radio frequency receiver 22. Voice processing system 24 is located so that it can receive voice commands from security system users. Voice processing system 24 includes a speaker verification module to identify individual users and a speech recognition module to process verbal commands.

The user identification devices allow security system 12 to identify individuals and monitor their presence in house 10. Thus, each individual not only has an identity, but also has a specific security status associated with their identity. Knowing which users are in house 10 and knowing each individual's security status and the security status of security system 12 allows call management controller 16 to define and customize call management services. These novel services can include night mode privacy, automated attendant, "follow me" service, "kid kontrol", "maid minder", and voice mail delivery.

In operation, the night mode privacy service functions in the following manner. When the security system 12 has been placed in night mode, all calls will be answered and the caller will be advised to leave a message unless it is an emergency. If the caller insists the call is important, the telephone 26 will ring. In the preferred embodiment, the telephone 26 will ring with a distinctive ring to denote an emergency call.

The automated attendant service functions in the following manner. Each user has a unique telephone number. When a call comes for a specific user, the telephone 26 rings as usual if the user is present in house 10. User presence is determined, as above, by the identification device. If the user is not present in house 10, an automated attendant offers to take a message without ringing telephone 26. If a call for a user known to be present in house 10 is not answered, then the automated attendant answers the call and takes a message. In this case, the automated attendant may also page the intended user, or ask the caller to hold the line and continue ringing telephone 26. If a user is on a call and another comes through, the user would get a call-waiting signal. Preferably, this call-waiting signal would be unique for each user.

The "follow me" service functions in the following manner. Multiple security systems may be interfaced to monitor several locations for user presence. In such a case, the security system distinguishes whether, for example, a user is occupying house 10, a neighbor's house or a work location. Thus, the security system controller 14 is aware when the user leaves or enters a location. In this manner, calls are directed toward a telephone 26 nearest the user location. Alternatively, calls could be transferred to voice mail if the user is not present, or forwarded to a known location, such as a cellular or mobile phone or other location.

The "kid kontrol" service functions in the following manner. Because each individual not only has a unique identity, but also has a specific security status associated with their identity, the presence of only minor children in house 10 can be determined. When this is determined, outbound telephone calls can be restricted in one of several ways. For example, toll calls can be prohibited or limited in length, total number of calls can be limited, duration of individual calls or total time on telephone 26 could be limited, etc. Another example of this service is "maid minder" that will limit numbers or types of calls when only service personnel are in the residence.

The voice mail delivery service functions in the following way. When a user enters house 10 and is identified, the security system could notify them that they have voice mail, e-mail, facsimiles or other messages. The call management system 16 could then offer to deliver these messages. Preferably, voice-processing system 24 would verbally notify the user and commence playback of any messages. Alternatives include using a speaker integrated with keypad 18, where the user is notified of messages upon manual passcode entry. If the user's identity is established using some device that requires no active involvement by the user, i.e., a radio frequency receiver/transponder, then the voice mail delivery service rings telephone 26 and notifies the user that they have messages. Preferably, the voice mail delivery service uses a distinctive ring.

From the foregoing, it can be seen that there has been brought to the art a new and improved security system with call management functionality. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A method of providing call management functionality for a security system coupled to a telephone network, said security system including a call management controller and a security controller, said method comprising the steps of:
   utilizing a voice processing system having speech recognition functionality to process a verbal command from a user so as to place said security controller in night mode and thereby generate a security controller state;
   communicating said security controller state to said call management controller so as to place said call management controller in a night mode privacy state;
   in response to an incoming telephone call, prompting the incoming caller to leave a message or ring through for an emergency;
   transferring said caller to a voice mailbox unless said call is an emergency; and
   allowing said caller to ring through to a telephone set if said call is an emergency.

2. A method of providing call management functionality for a security system as recited in claim 1, wherein the step of allowing said caller to ring through to a telephone set specifically comprises the step of distinctively ringing said telephone set to denote an emergency.

3. A security system with call management functionality coupled to a telephone network for providing at least one telephone service, said telephone network having at least one telephone line, said security system comprising:
   a call management controller coupled to said telephone network for individually enabling, disabling, or modifying each said telephone service;
   a security controller coupled to said call management controller;
   a plurality of sensors coupled to said security controller for providing at least one home security function; and
   a voice processing system coupled to said security controller and having speech recognition functionality for processing verbal commands from a user so as to operate said security system:
   wherein said at least one telephone service comprises at least one service selected from the group consisting of night mode privacy, automated attendant, follow me service, kid control, maid minder, and voice mail delivery.

4. A method of providing call management functionality for a security system coupled to a telephone network, said security system including a call management controller and a security controller, said method comprising the steps of:
   providing at least one telephone service wherein said at least one telephone service comprises at least one service selected from the group consisting of night mode privacy, automated attendant, follow me service, kid control, maid minder, and voice mail delivery;
   utilizing a voice processing system having speaker verification functionality to identify a user so as to generate a user identity; and
   selectively modifying each of said at least one telephone service in response to said user identity.

5. A method of providing call management functionality for a security system as recited in claim 4, wherein the step of providing at least one telephone service specifically includes the step of providing said follow me service, which comprises the steps of:
   monitoring at least two locations to determine user location based upon said user identity; and
   transferring a caller to said user location.

6. A method of providing call management functionality for a security system as recited in claim 4, wherein the step of providing at least one telephone service specifically includes the step of providing said kid control service, which comprises the step of restricting outbound calls based on said user identity.

7. A method of providing call management functionality for a security system as recited in claim 4, wherein the step of providing at least one telephone service specifical includes the step of providing said automated attendant service, which comprises the steps of:

associating a phone line to correspond to said user identity;

determining user presence based upon said user identity;

allowing a caller to ring through to a telephone set if user presence is detected and said telephone set is not being used;

generating a distinctive call-waiting signal to denote which user is being called if user presence is detected and said telephone set is being used; and transferring said caller to a voice mailbox that corresponds to said user identity if user presence is not detected.

* * * * *